(12) United States Patent
Aziz

(10) Patent No.: US 7,606,301 B2
(45) Date of Patent: Oct. 20, 2009

(54) METHOD AND APPARATUS FOR ADAPTIVELY ESTABLISHING A SAMPLING PHASE FOR DECISION-FEEDBACK EQUALIZATION

(75) Inventor: Pervez M. Aziz, Dallas, TX (US)

(73) Assignee: Agere Systems Inc., Allentown, PA (US)

( * ) Notice: Subject to any disclaimer, the term of this patent is extended or adjusted under 35 U.S.C. 154(b) by 566 days.

(21) Appl. No.: 11/356,690

(22) Filed: Feb. 17, 2006

(65) Prior Publication Data

US 2007/0206670 A1 Sep. 6, 2007

(51) Int. Cl.
*H03H 7/30* (2006.01)
(52) U.S. Cl. ..................... 375/233; 375/355
(58) Field of Classification Search ......... 375/229–236, 375/355
See application file for complete search history.

(56) References Cited

U.S. PATENT DOCUMENTS 5,724,397 A * 3/1998 Torsti ........................ 375/355

7,184,477 B2 * 2/2007 Haunstein et al. ........... 375/233

OTHER PUBLICATIONS

Stojanovic et al., "Autonomous Dual-Mode (PAM2/4) Serial Link Transceiver with Adaptive Equalization and Data Recovery," IEEE Journal of Solid-State Circuits, vol. 40, No. 4, pp. 1012-1026 (Apr. 2005).

* cited by examiner

*Primary Examiner*—Kevin Y Kim
(74) *Attorney, Agent, or Firm*—Ryan, Mason & Lewis, LLP

(57) ABSTRACT

Methods and apparatus are provided for adaptively establishing the optimal sampling phase offset for a DFE operation. According to one aspect of the invention, one or more values in an amplitude domain are converted into a time domain, for example, using a phase detector, based on phase information to provide said sampling phase. The values in the amplitude domain optionally comprise one or more of detected DFE data, $\hat{y}(n)$ and a sign of an error term for detected DFE data. The sampling phase can establish the phase of an independent clock or an offset to a second clock, such as a clock recovered from a received signal by a clock and data recovery (CDR) circuit.

16 Claims, 6 Drawing Sheets

| $\hat{y}_d(n)$ | $\hat{y}_d(n-2)$ | sgn[e(n-1)] | PDOUT=s(n) |
|---|---|---|---|
| 0 | 0 | 0 | 0 |
| 0 | 1 | 0 | 1 |
| 1 | 0 | 0 | -1 |
| 1 | 1 | 0 | 0 |
| 0 | 0 | 1 | 0 |
| 0 | 1 | 1 | -1 |
| 1 | 0 | 1 | 1 |
| 1 | 1 | 1 | 0 |

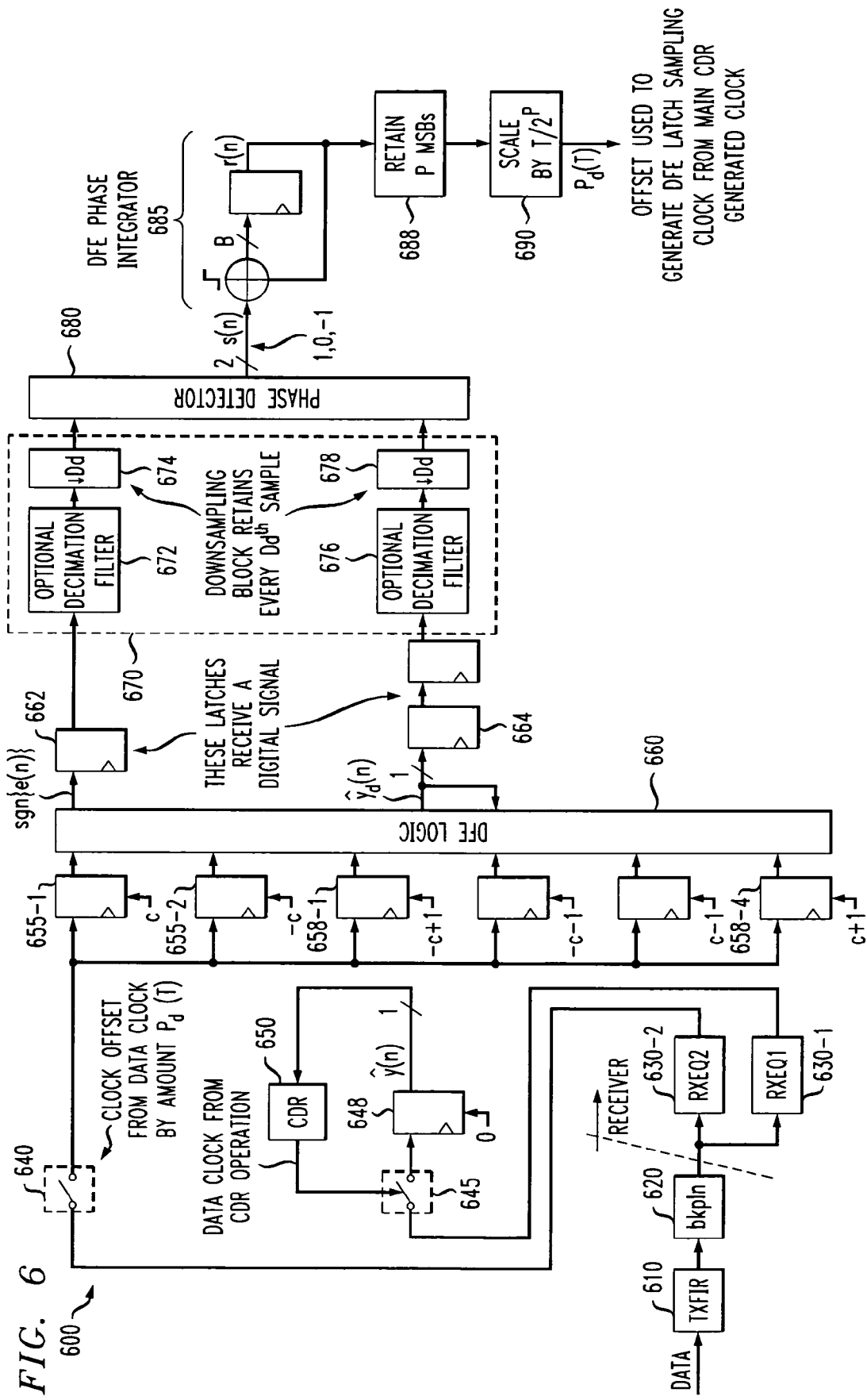

METHOD AND APPARATUS FOR ADAPTIVELY ESTABLISHING A SAMPLING PHASE FOR DECISION-FEEDBACK EQUALIZATION

CROSS-REFERENCE TO RELATED APPLICATIONS

The present application is related to United States patent application entitled "Method and Apparatus for Generating One or More Clock Signals for a Decision-Feedback Equalizer Using DFE Detected Data," filed contemporaneously herewith and incorporated by reference herein.

FIELD OF THE INVENTION

The present invention relates generally to decision-feedback equalization techniques, and more particularly, to techniques for adaptively establishing a sampling phase for decision-feedback equalization.

BACKGROUND OF THE INVENTION

Digital communication receivers must sample an analog waveform and then reliably detect the sampled data. Signals arriving at a receiver are typically corrupted by intersymbol interference (ISI), crosstalk, echo, and other noise. Thus, receivers must jointly equalize the channel, to compensate for such distortions, and decode the encoded signals at increasingly high clock rates. Decision-feedback equalization (DFE) is a widely-used technique for removing intersymbol interference and other noise. For a detailed discussion of decision feedback equalizers, see, for example, R. Gitlin et al., Digital Communication Principles, (Plenum Press 1992) and E. A. Lee and D. G. Messerschmitt, Digital Communications, (Kluwer Academic Press, 1988), each incorporated by reference herein. Generally, decision-feedback equalization utilizes a nonlinear equalizer to equalize the channel using a feedback loop based on previously decided symbols.

In one typical DFE implementation, a received analog signal is sampled and compared to one or more thresholds to generate the detected data. A DFE correction, v(t), is subtracted in a feedback fashion to produce a DFE corrected signal w(t). Historically, the same clock, generated from the received signal by a clock and data recovery (CDR) circuit, was used to sample the incoming signal and for the DFE operation. It has been recognized, however, that the data sampling and DFE operations may have different optimal sampling points. Thus, a number of techniques have been proposed or suggested for sampling the DFE latches with a sampling phase that may be offset from the normal CDR data clock sampling phase. For example, it has been suggested to manually establish the DFE clock offset. The optimal DFE sampling phase, however, is dependent on the channel or other equalizer settings. Thus, optimizing the sampling phase across a range of programmable values becomes a burden.

A need therefore exists for methods and apparatus for adaptively establishing the optimal sampling phase offset for the DFE operation.

SUMMARY OF THE INVENTION

Generally, methods and apparatus are provided for adaptively establishing the optimal sampling phase offset for a DFE operation. According to one aspect of the invention, one or more values in an amplitude domain are converted into a time domain, for example, using a phase detector, based on phase information to provide said sampling phase. The values in the amplitude domain optionally comprise one or more of detected DFE data, ŷ(n) and a sign of an error term for detected DFE data. The sampling phase can establish the phase of an independent clock or an offset to a second clock, such as a clock recovered from a received signal by a clock and data recovery (CDR) circuit.

The output of the phase detector can optionally be filtered, and one or more least significant bits can optionally be dropped from the sampling phase. In addition, the sampling phase can optionally be scaled to generate a time offset value.

A more complete understanding of the present invention, as well as further features and advantages of the present invention, will be obtained by reference to the following detailed description and drawings.

BRIEF DESCRIPTION OF THE DRAWINGS

FIG. 5 is a sample truth table for the exemplary baud spaced phase detector of FIG. 4; and FIG. 6 is a block diagram of an alternate serializer/deserializer communication channel incorporating features of the present invention.

DETAILED DESCRIPTION

Figure 1:
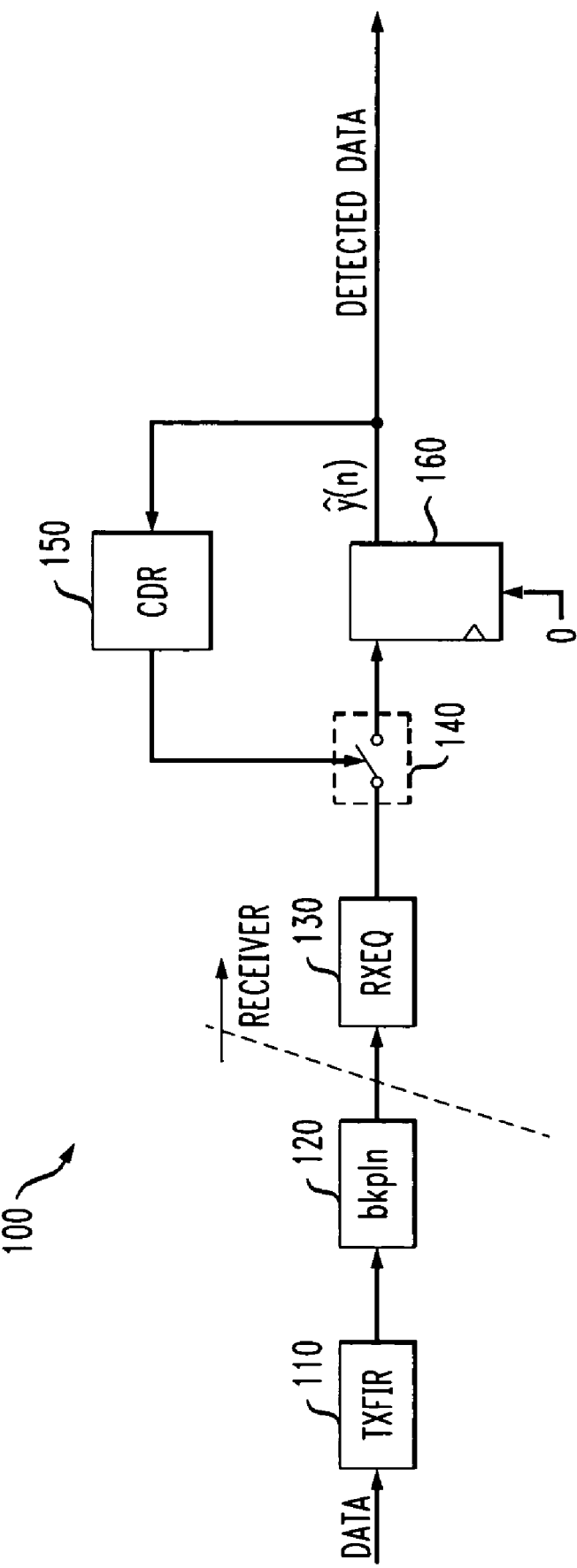
FIG. 1 is a block diagram of a conventional serializer/deserializer communication channel having a channel impairment.

The present invention provides methods and apparatus for adaptively establishing the optimal sampling phase offset for the DFE operation. FIG. 1 is a block diagram of a conventional serializer/deserializer communication channel 100 having a channel impairment that is due, for example, to a physical transmission medium, such as a backplane or drive head in a magnetic recording system. In the exemplary implementation shown in FIG. 1, the data is transmitted through a backplane channel 120 after optionally being equalized or filtered through a transmit FIR filter (TXFIR) 110. After passing though the backplane 120, the analog signal may optionally be filtered or equalized by a receive equalizer (RXEQ) 130 which may consist, for example, of a continuous time filter. The analog signal out of the RXEQ 130 is sampled at the baud rate by a switch 140 using a sampling clock generated by a clock/data recovery (CDR) circuit 150. A data detector 160 (or a slicer) digitizes the sample and compares the digitized sample to an exemplary threshold of zero, using the CDR recovered clock.

The phase of the analog waveform is typically unknown and there may be a frequency offset between the frequency at which the original data was transmitted and the nominal receiver sampling clock frequency. The function of the CDR 150 is to properly sample the analog waveform such that when the sampled waveform is passed through a data detector 160, the data is recovered properly despite the fact that the phase and frequency of the transmitted signal is not known. The CDR is often an adaptive feedback circuit and the feedback loop must adjust the phase and frequency of the nominal clock to produce a modified recovered clock that can sample the analog waveform to allow proper data detection.

As previously indicated, the data detector 160 can be implemented as a slicer (i.e., a decision device based on an amplitude threshold) or a more complicated detector such as a sequence detector. For high speed applications, the data detector 160 is often implemented as a slicer that is clocked by the CDR clock. In addition to sampling the data signal, the slicer 160 essentially quantizes the signal to a binary "1" or "0" based on the sampled analog value and a slicer threshold, $s_t$. If the input to the slicer 160 at time n is w(n), then the output, ŷ(n), of the slicer 160 is given as follows:

$$\hat{y}(n) = 1 \text{ if } w(n) > s_t \quad (1)$$
$$= 0 \text{ otherwise}$$

*DFE Background*

As data rates increase for serializer/deserializer applications, the channel quality degrades and the use of decision feedback equalization (DFE) in conjunction with finite impulse response (TXFIR) and receive equalization (RXEQ) filtering will be required to achieve the bit error rate (BER) performance required by more and more demanding applications. Note that the FIR function of the transmitter (TX) might be moved from the transmitter to the receiver (RX) and incorporated into the RXEQ function.

Figure 2:
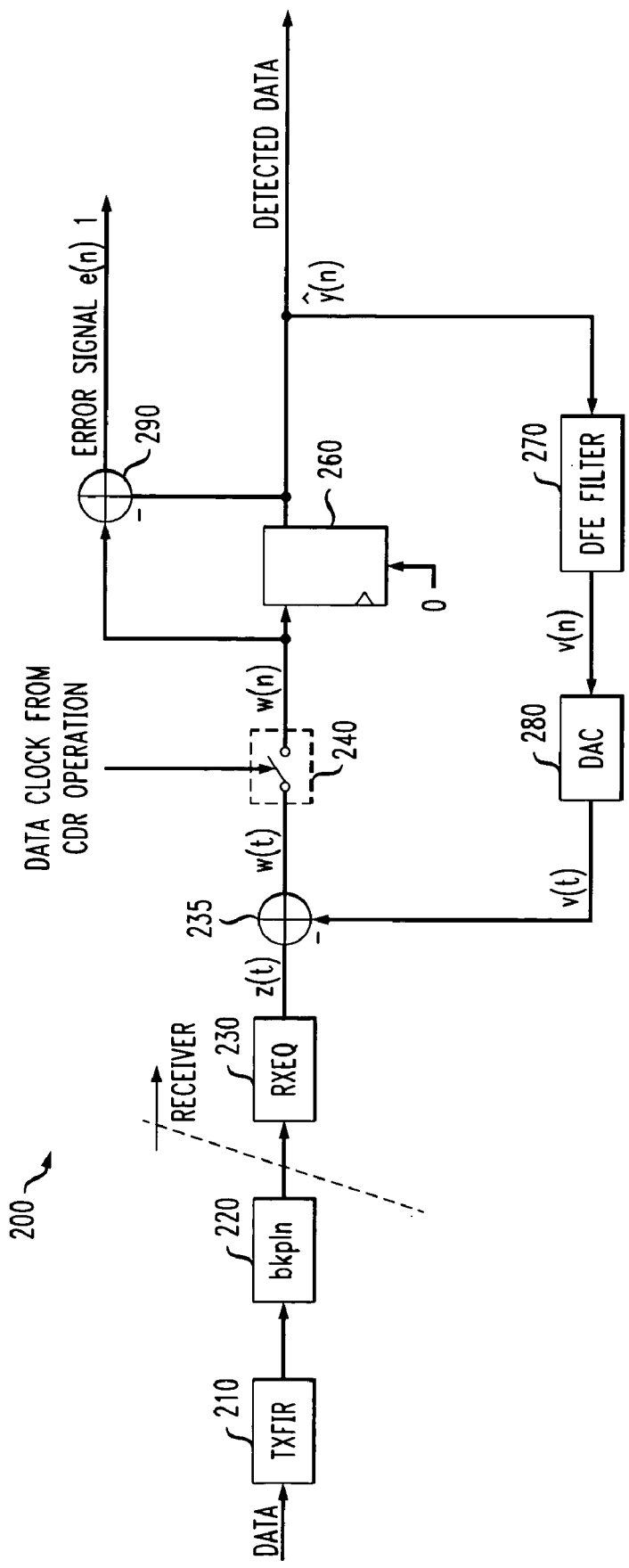
FIG. 2 is a block diagram of a conventional serializer/deserializer communication channel incorporating decision-feedback equalization.

FIG. 2 is a block diagram of a conventional serializer/deserializer communication channel 200 that incorporates a traditional DFE based equalizer in addition to the TX and RX equalization of FIG. 1. As shown in FIG. 2, the data is transmitted through a backplane channel 220 after optionally being equalized or filtered through a transmit FIR filter (TXFIR) 210. After passing though the backplane 220, the analog signal may optionally be filtered or equalized by a receive equalizer (RXEQ) 230 which may consist, for example, of a continuous time filter. The analog signal out of the RXEQ 230 is sampled at the baud rate by a switch 240 using a sampling clock generated by a clock/data recovery (CDR) circuit 150, in a similar manner to FIG. 1.

As discussed hereinafter, a DFE correction, v(t), generated by a DFE filter 270 and digitized by a digital-to-analog converter 280 is subtracted by an analog summer 235 from the output, z(t), of the RXEQ 230 to produce a DFE corrected signal w(t).

$$w(t)=z(t)-v(t) \quad (2)$$

Then, the signal w(t) is sampled by a switch 240:

$$w(n)=w(nT) \quad (3)$$

with T being the baud period. The sampled signal w(n) is then sliced by a slicer 260 to produce the detected data ŷ(n). The slicer output in turn is used to produce the filtered DFE output v(n) which is converted by the DAC 280 to the continuous time signal v(t). The DFE filter output 280 is given by:

$$v(n) = \sum_{l=1}^{L} b(l)\hat{y}(n-l) \quad (4)$$

where b(l) represents the coefficients of the L tap DFE.

As shown in FIG. 2, a second adder 290 generates an error signal, e(n), that represents an error term that may be used in conjunction with ŷ(n) to adapt the DFE tap values or the CDR. The error signal, e(n), may be expressed as follows:

$$e(n)=w(n)-\hat{y}(n) \quad (5)$$

It is noted that the DFE filter 270 uses as its input past data decisions starting at ŷ(n−1) and earlier. The DFE filter 270 does not use the current decision ŷ(n). This guarantees that the operation is causal. For this circuit to work, the entire DFE loop correction must be performed within one baud period T before the next correction is needed. At very high data rates, it is difficult to design circuits that operate this fast or to make them very accurate.

Consequently, a well known technique may be employed whereby the DFE terms are "precomputed" and combined with the uncorrected DFE decision based upon the current decision ŷ(n). Since there is no DFE feedback loop, the process of generating the DFE "corrected" decisions can be pipelined.

Figure 3:
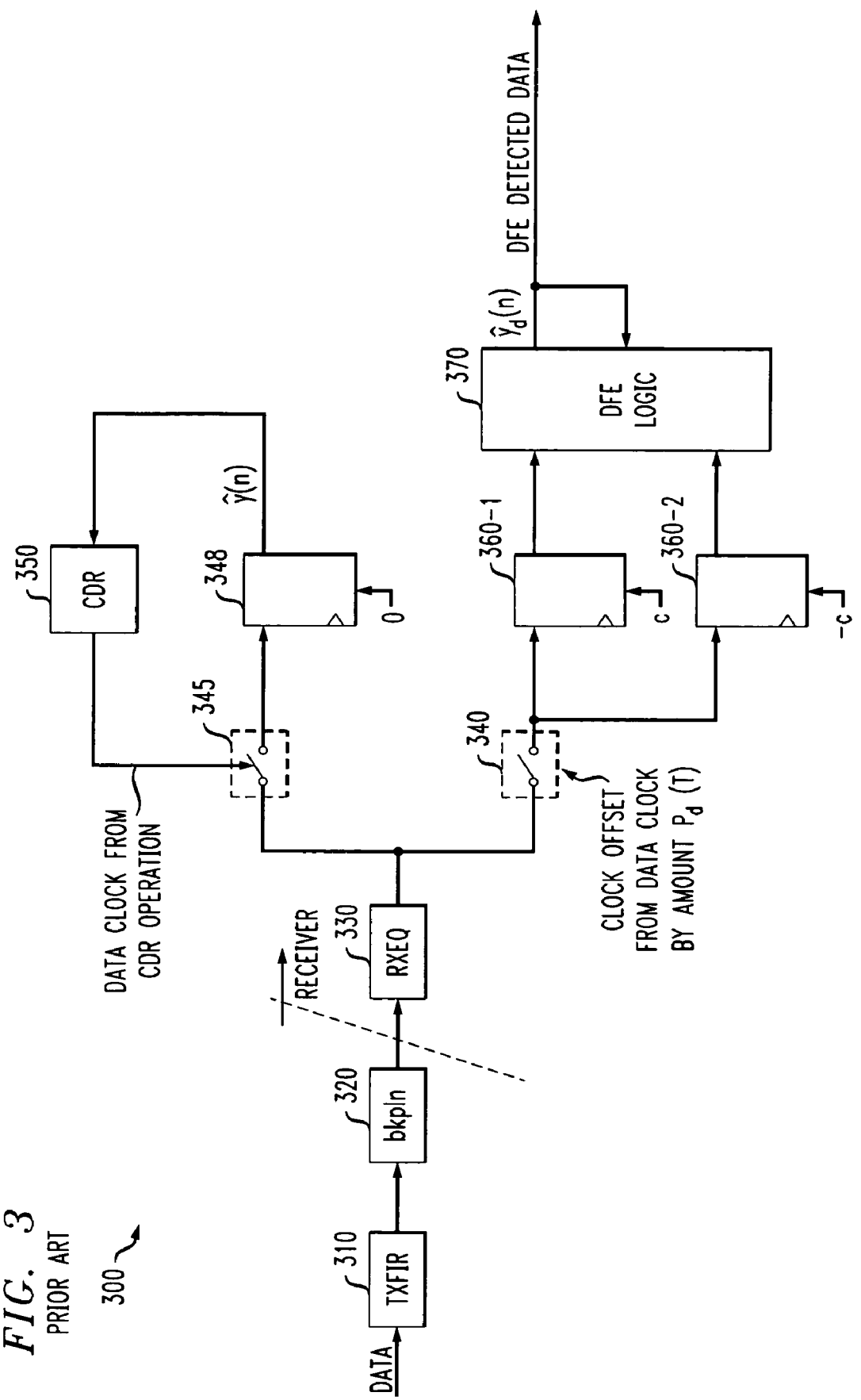
FIG. 3 is a block diagram of a serializer/deserializer communication channel incorporating precomputation.

FIG. 3 is a block diagram of a serializer/deserializer communication channel 300 that incorporates precomputation of the DFE terms, in addition to the TX and RX equalization of FIGS. 1 and 2. The exemplary embodiment shown in FIG. 3 is for a one tap (L=1) DFE that makes use of a DFE coefficient b(1). For simplicity of notation, b(1) is denoted by the variable c.

As shown in FIG. 3, the data is transmitted through a backplane channel 320 after optionally being equalized or filtered through a transmit FIR filter (TXFIR) 310. After passing though the backplane 320, the analog signal may optionally be filtered or equalized by a receive equalizer (RXEQ) 330. The analog output of the RXEQ 330 is sampled at the baud rate by switches 340, 345. The switch 345 in a non-DFE path uses a sampling clock generated by the clock/data recovery (CDR) circuit 350, in a similar manner to FIG. 1. A latch 348 having an exemplary threshold of 0 is used to generated a decision from the non-DFE equalized signal, in a similar manner to FIG. 1.

The present invention recognizes that the CDR and DFE operations may have different optimal sampling points. Therefore, the DFE latches must be sampled with a correct sampling phase that may be offset from the normal CDR data clock sampling phase by some offset $p_d$ in units of baud interval T. Thus, according to one aspect of the present invention, the switch 340 in the DFE path is controlled by a clock that is offset from the CDR data clock by an amount equal to $p_d(T)$. A number of techniques have been proposed or suggested for manually establishing the offset $p_d(T)$. The optimal sampling phase, however, is dependent on the channel or other equalizer settings.

As shown in FIG. 3, exemplary latches 360-1 and 360-2 having thresholds of c and −c, respectively, are used to generate a decision for the DFE equalized signal. The outputs of the latches 360 are applied to DFE logic 370 to generate the DFE corrected decision $\hat{y}_d(n)$.

The DFE logic 370 selects from the pre-computed decisions, which are the outputs of the latches 3460 with thresholds c and c, based on the past decision $\hat{y}_d(n-1)$.

For the case when $\hat{y}_d(n-1)=1$, $$\hat{y}_d(n) = 1 \text{ if } y(n) > c$$
$$= 0 \text{ if } y(n) < c$$

For the case when $\hat{y}_d(n-1)=0$, $$\hat{y}_d(n) = 1 \text{ if } y(n) > -c$$
$$= 0 \text{ if } y(n) < -c.$$

It is noted that the DFE can be extended to more than one tap at the expense of additional area and computation time. The exemplary DFE phase placement circuit presented herein can be extended to a system with multiple DEE taps without changing the DFE phase placement circuit. For additional taps, the number of latches and the DFE logic block would be modified, as would be apparent to a person of ordinary skill in the art.

Adaptive Determination of DFE Sampling Phase Offset

As previously indicated, the present invention adaptively establishes the DFE sampling phase offset, $p_d$. In particular, an exemplary embodiment of the present invention adaptively and automatically establishes the DFE sampling phase offset, $p_d$, independent of the specific TXFIR, RXEQ setting or backplane channel. The DFE sampling phase offset $p_d$ (units of baud period T) is adaptively computed with respect to the non-DFE CDR recovered clock phase, such that the DFE latches are automatically sampled at an optimal sampling point.

Figure 4:
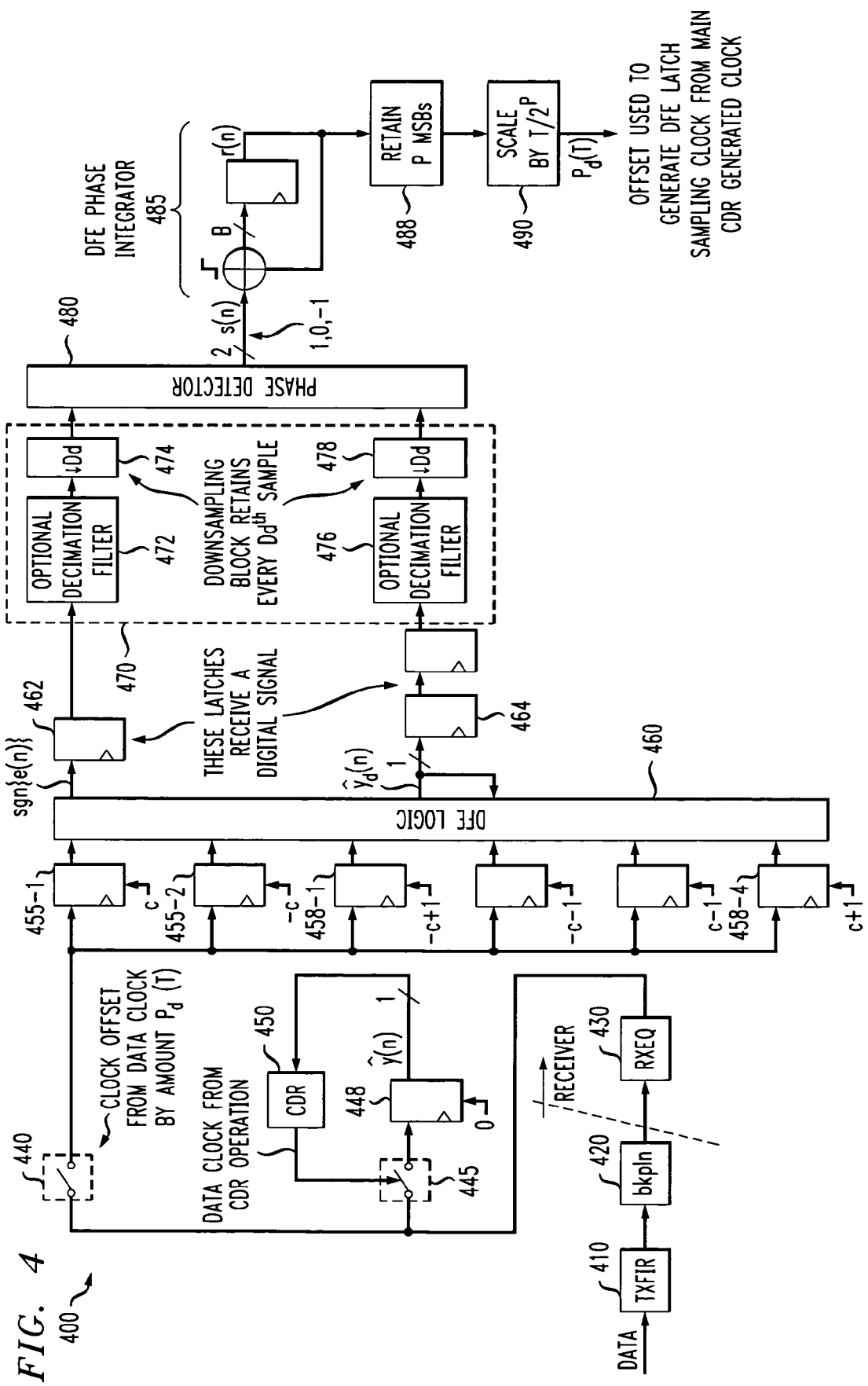
FIG. 4 is a block diagram of a serializer/deserializer communication channel incorporating features of the present invention.

FIG. 4 is a block diagram of a serializer/deserializer communication channel 400 incorporating features of the present invention. As shown in FIG. 4, the serializer/deserializer communication channel 400 includes a transmit FIR filter 410, backplane channel 420, receive equalizer 430, switch 445 (in a non-DFE path), and CDR circuit 450, in the manner described above.

The switch 440 in the DFE path is controlled by a clock that is offset from the CDR data clock by an amount equal to $p_d(T)$. Generally, the DFE sampling phase offset $p_d$ (units of baud period T) is adaptively computed in accordance with an exemplary embodiment of the present invention using a decimated or downsampled phase detector (PD) in conjunction with a phase recovery loop. The phase recovery loop can be implemented, for example, as a first order CDR loop that is auxiliary to the main CDR loop. Generally, the phase detector 480 is embodied as a baud spaced phase detector that does not make use of intrabaud samples. The phase detector 480 determines the sampling phase offset, $p_d$, by converting values in the amplitude domain into the time domain. As discussed hereinafter, the exemplary phase detector 480 determines how much to change the sampling phase offset, $p_d$, by converting (i) the detected DFE data, $\hat{y}(n)$, defined above, and (ii) the sign of the DFE error, sgn[e(n)] from the amplitude domain to the time domain. The sign of the DFE error, sgn[e(n)], equals one (1) if e(n) is greater than or equal to zero and 0 otherwise.

As shown in FIG. 4, two exemplary latches 455-1 and 455-2 having thresholds of c and −c, respectively, are used to generate a decision for the DFE equalized signal, $\hat{y}(n)$, as discussed above in conjunction with FIG. 3. In addition, four additional latches 458-1 through 458-4 having thresholds −c−1, −c+1, c+1, and c−1 are used to determine the sign of the DFE error, sgn[e(n)]. The DFE logic 460 can be appropriately modified to provide the sign of the error. It is noted that the four latches 458-1 through 458-4 would already be required in a system where the DFE and TXFIR taps are adapted, for example, using the sign-sign zero forcing (ZF) or least mean square (LMS) algorithms. Thus, the exemplary adaptive DFE phase placement algorithm of the present invention makes use of signals already likely to be present.

The detected DFE data, $\hat{y}(n)$, and the sign of the DFE error, sgn[e(n)], as generated by the DFE logic 460, are quantized values that are sampled by latches (flip flops) 462, 464 operating at the baud rate. The outputs of the latches 462, 464 are optionally decimated by a decimation filter 472, 476, respectively, and then downsampled by downsampling blocks 474, 478, respectively, at stage 470 to permit processing of additional bits at a lower rate.

The decimated/downsampled versions of the two quantities sgn[e(n)] and $\hat{y}(n)$ are combined by the exemplary phase detector 480 to produce a phase detector output (PDOUT) or s(n) given by the truth table 500 shown in FIG. 5

It is noted that a more complicated phase detector 480 (producing a more accurate estimate) could be chosen incorporating the use of additional detected data bits $\hat{y}(n-K)$. Of course, the corresponding truth table 500 would be different and more complex as well. Alternatively, the output of the phase detector 480 can also be represented mathematically in terms of its inputs as follows:

$$s(n)=\text{sgn}[e(n-1)][\hat{y}_d(n)-\hat{y}_d(n-2)] \quad (6)$$

In general, the first term in equation (6) characterizes the error and the second term characterizes the slope of the detected data bits $\hat{y}_d$ (the signal estimate minus the signal estimate for two time slots earlier). See, e.g., Qureshi, "Timing Recovery for Equalized Partial-Response Systems," *IEEE Transactions on Communications*, 1326-31 (December, 1976) or P. Aziz and S. Surendran, "Symbol Rate Timing Recovery for Higher Order Partial Response Channels", *IEEE Journal on Selected Areas in Communications*, 635-48 (April, 2001).

The downsampled output of the phase detector 480 is applied to an integrator 485 that filters the phase detector output to provide an estimate of the required phase offset. The function of the integrator 485 is well known and can be represented mathematically as follows:

$$r(n)=s(n-1)+r(n-1) \quad (7)$$

In a fixed point representation, the integrator 485 would be of finite bit precision. For example, the integrator 485 may be B bits long to accurately represent the filtered phase detector output. Thus, the output of the adder is clipped to B bits, i.e., to $-2^{B-1}$ to $2^{B-1}$. As shown in FIG. 4, in the exemplary embodiment, only the P most significant bits (MSBs) are retained at stage 488 for the final output. Thus, the input to stage 488 is a high resolution number and the output is a coarse number. The P MSBs of the integrator 485 can be scaled at stage 490 by $T/2^P$ to produce the final phase offset $p_d$ in units of the baud period T (as opposed to a digital number).

The decimation filters 472, 476 can be implemented, for example, in a similar manner to those described in U.S. patent application Ser. No. 10/965,138, filed Oct. 14, 2004, entitled, "Parallel Sampled Multi Stage Decimated Digital Loop Filter For Clock/Data Recovery." Generally, the decimation process involves (i) filtering the input stream to combine successive low bit resolution samples into higher bit resolution samples, and (ii) retaining only one $D_d$ of these high resolution samples. It is noted that this implies that the exemplary DFE automatic phase placement circuit 400 comprising the phase detector 480 and integrator 485 operates at only $1/D_d$th of the baud rate. In practice, because the DFE phase offset $p_d$ will not change significantly for a given TXFIR, RXEQ, and channel combination, the decimation filter may be eliminated altogether and only every $D_d$th sample is retained.

It is noted that the arithmetic widths of the decimation/downsampling stages 470 and integrator 485, as well as the downsampling factor Dd, are flexible depending on the needs of a particular application.

FIG. 5 is a sample truth table 500 for the exemplary baud spaced phase detector 480 of FIG. 4.

FIG. 6 is a block diagram of an alternate serializer/deserializer communication channel 600 incorporating features of the present invention. Generally, the embodiment shown in FIG. 6 operates in a similar manner to the embodiment of FIG. 4, with a second RXEQ 630 to optimize the performance of both the DFE and Non-DFE paths by using two separate receive equalizers. As shown in FIG. 6, the serializer/deserializer communication channel 600 includes a transmit FIR filter 610, backplane channel 620, first receive equalizer 630-1, switch 645 (in a non-DFE path), and CDR circuit 450, in the manner described above in conjunction with FIG. 4.

A second receive equalizer 630-2 may be embodied, for example, as a continuous time filter. The analog signal out of the RXEQ2 630-2 is sampled by a switch 640 in the DFE path. The switch 640 is controlled by a clock that is offset from the CDR data clock by an amount equal to $p_d(T)$. Generally, the DFE sampling phase offset $p_d$ (units of baud period T) is adaptively computed in accordance with an exemplary embodiment of the present invention using a decimated or downsampled phase detector (PD) in conjunction with a phase recovery loop. The phase recovery loop can be implemented, for example, as a first order CDR loop that is auxiliary to the main CDR loop. Generally, the phase detector 680 is embodied as a baud spaced phase detector that does not make use of intrabaud samples. The phase detector 680 determines the sampling phase offset, $p_d$, by converting values in the amplitude domain into the time domain. As discussed hereinafter, the exemplary phase detector 680 determines how much to change the sampling phase offset, $p_d$, by converting (i) the detected DFE data, $\hat{y}(n)$, defined above, and (ii) the sign of the DFE error, sgn[e(n)] from the amplitude domain to the time domain. The sign of the DFE error, sgn[e(n)], equals one (1) if e(n) is greater than or equal to zero and 0 otherwise.

As shown in FIG. 6, two exemplary latches 655-1 and 655-2 having thresholds of c and −c, respectively, are used to generate a decision for the DFE equalized signal, $\hat{y}(n)$, as discussed above in conjunction with FIG. 3. In addition, four additional latches 658-1 through 658-4 having thresholds −c−1, −c+1, c+1, and c−1 are used to determine the sign of the DFE error, sgn[e(n)]. The DFE logic 660 can be appropriately modified to provide the sign of the error. It is noted that the four latches 658-1 through 658-4 would already be required in a system where the DFE and TXFIR taps are adapted, for example, using the sign-sign zero forcing (ZF) or least mean square (LMS) algorithms. Thus, the exemplary adaptive DFE phase placement algorithm of the present invention makes use of signals already likely to be present.

The detected DFE data, $\hat{y}(n)$, and the sign of the DFE error, sgn[e(n)], as generated by the DFE logic 660, are quantized values that are sampled by latches (flip flops) 662, 664 operating at the baud rate. The outputs of the latches 662, 664 are optionally decimated by a decimation filter 672, 676, respectively, and then downsampled by downsampling blocks 674, 678, respectively, at stage 670 to permit processing of additional bits at a lower rate.

The decimated/downsampled versions of the two quantities sgn[e(n)] and $\hat{y}(n)$ are combined by the exemplary phase detector 680 to produce a phase detector output (PDOUT) or s(n) given by the truth table 500 shown in FIG. 5

The downsampled output of the phase detector 680 is applied to an integrator 685 that filters the phase detector output to provide an estimate of the required phase offset. The function of the integrator 685 is well known and can be represented mathematically as follows:

$$r(n)=s(n-1)+r(n-1).$$

In a fixed point representation, the integrator 685 would be of finite bit precision. For example, the integrator 685 may be B bits long to accurately represent the filtered phase detector output. Thus, the output of the adder is clipped to B bits, i.e., to $-2^{B-1}$ to $2^{B-1}$. As shown in FIG. 6, in the exemplary embodiment, only the P most significant bits (MSBs) are retained at stage 688 for the final output. Thus, the input to stage 688 is a high resolution number and the output is a coarse number. The P MSBs of the integrator 685 can be scaled at stage 690 by $T/2^P$ to produce the final phase offset $p_d$ in units of the baud period T (as opposed to a digital number).

The decimation filters 672, 676 can be implemented, for example, in a similar manner to those described in U.S. patent application Ser. No. 10/965,138, filed Oct. 14, 2004, entitled, "Parallel Sampled Multi Stage Decimated Digital Loop Filter For Clock/Data Recovery." Generally, the decimation process involves (i) filtering the input stream to combine successive low bit resolution samples into higher bit resolution samples, and (ii) retaining only one $D_d$ of these high resolution samples. It is noted that this implies that the exemplary DFE automatic phase placement circuit 600 comprising the phase detector 680 and integrator 685 operates at only $1/D_d$th of the baud rate. In practice, because the DFE phase offset $p_d$ will not change significantly for a given TXFIR, RXEQ, and channel combination, the decimation filter may be eliminated altogether and only every $D_d$th sample is retained.

It is noted that the arithmetic widths of the decimation/downsampling stages 670 and integrator 685, as well as the downsampling factor Dd, are flexible depending on the needs of a particular application.

It is to be understood that the embodiments and variations shown and described herein are merely illustrative of the principles of this invention and that various modifications may be implemented by those skilled in the art without departing from the scope and spirit of the invention.

I claim:

1. A method for adaptively establishing a sampling phase for a decision-feedback equalization (DFE) operation, comprising:
    converting one or more values in an amplitude domain into a time domain based on phase information to provide said sampling phase, wherein said sampling phase adaptively establishes an offset to a second clock, wherein said second clock is recovered from a received signal by a clock and data recovery (CDR) circuit for a non-DFE path.

2. The method of claim 1, wherein said value in an amplitude domain comprises detected DFE data, $\hat{y}(n)$.

3. The method of claim 1, wherein said value in an amplitude domain comprises a sign of an error term for detected DFE data.

4. The method of claim 1, wherein said sampling phase establishes the phase of an independent clock.

5. The method of claim 1, wherein said converting step is performed by a phase detector.

6. The method of claim 5, further comprising the step of filtering an output of said phase detector.

7. The method of claim 1, further comprising the step of dropping one or more least significant bits from said sampling phase.

8. The method of claim 1, further comprising the step of scaling said sampling phase to generate a time offset value.

9. A receiver for processing data received on a channel, comprising:
    a decision-feedback equalizer for equalizing said channel; and
    a phase detector for converting one or more values in an amplitude domain into a time domain to adaptively establish a sampling phase for said decision-feedback equalizer, wherein said sampling phase adaptively establishes an offset to a second clock, wherein said second clock is recovered from a received signal by a clock and data recovery (CDR) circuit for a non-DFE path.

10. The receiver of claim 9, wherein said value in an amplitude domain comprises detected DFE data, $\hat{y}(n)$.

11. The receiver of claim 9, wherein said value in an amplitude domain comprises a sign of an error term for detected DFE data.

12. The receiver of claim 9, wherein said sampling phase establishes the phase of an independent clock.

13. The receiver of claim 9, further comprising a filter to filter an output of said phase detector.

14. The receiver of claim 9, further comprising means for dropping one or more least significant bits from said sampling phase.

15. The receiver of claim 9, further comprising a first receive equalizer to process a DFE path and a second receive equalizer to process a Non-DFE paths by using two separate receive equalizers.

16. A method for adaptively establishing a sampling phase for a decision-feedback equalization (DFE) operation, comprising:

converting one or more of detected DFE data, $\hat{y}(n)$, and a sign of an error term for detected DFE data in an amplitude domain into a time domain based on phase information to provide said sampling phase, wherein said sampling phase adaptively establishes an offset to a second clock, wherein said second clock is recovered from a received signal by a clock and data recovery (CDR) circuit for a non-DFE path.

* * * * *